(12) United States Patent
Kim et al.

(10) Patent No.: US 6,696,170 B2
(45) Date of Patent: Feb. 24, 2004

(54) COPPER-FREE WIRE

(75) Inventors: Yongchul Kim, Changwon (KR); Jaehyoung Lee, Changwon (KR)

(73) Assignee: Kiswel Ltd., Kyoungnam (KR)

( * ) Notice: Subject to any disclaimer, the term of this patent is extended or adjusted under 35 U.S.C. 154(b) by 19 days.

(21) Appl. No.: 10/108,510

(22) Filed: Mar. 29, 2002

(65) Prior Publication Data

US 2003/0015511 A1 Jan. 23, 2003

(30) Foreign Application Priority Data

Apr. 19, 2001 (KR) .................................. 2001-0021015

(51) Int. Cl.$^7$ ............................................. B32K 35/02
(52) U.S. Cl. ..................................... 428/606; 219/145.1
(58) Field of Search ...................... 219/145.1; 148/400; 428/606, 687

(56) References Cited

U.S. PATENT DOCUMENTS

| | | | |
|---|---|---|---|
| 4,841,119 A | * | 6/1989 | Chambaere ............... 219/146.1 |
| 5,550,348 A | * | 8/1996 | Masaie et al. .......... 219/145.22 |
| 6,054,675 A | * | 4/2000 | Kurokawa et al. ........ 219/146.1 |
| 6,079,243 A | * | 6/2000 | Inoue et al. ..................... 72/41 |
| 2002/0014477 A1 | * | 2/2002 | Lee et al. ................. 219/145.1 |
| 2003/0164360 A1 | * | 9/2003 | Yamaoka et al. ......... 219/145.1 |

FOREIGN PATENT DOCUMENTS

| | | | |
|---|---|---|---|
| JP | 57-56170 | * | 4/1982 |
| JP | 57-56171 | * | 4/1982 |
| JP | 5-161973 | * | 6/1993 |
| JP | 08-019893 | | 1/1996 |
| JP | 08-103885 | | 4/1996 |
| JP | 08-103886 | | 4/1996 |
| JP | 9-76089 | * | 3/1997 |
| JP | 09-136186 | | 5/1997 |
| JP | 9-150292 | * | 6/1997 |
| JP | 10-272596 | * | 10/1998 |
| JP | 11-047981 | | 2/1999 |
| JP | 11-077373 | | 3/1999 |
| JP | 11-104883 | | 4/1999 |
| JP | 11-147174 | | 6/1999 |
| JP | 11-277291 | | 10/1999 |
| JP | 11-342494 | | 12/1999 |
| JP | 2000-094178 | | 4/2000 |
| JP | 2000-107881 | * | 4/2000 |
| JP | 2000-117483 | | 4/2000 |
| JP | 2000-141080 | | 5/2000 |
| JP | 2000-317679 | | 11/2000 |
| JP | 2002-86290 | * | 3/2002 |

* cited by examiner

*Primary Examiner*—John J. Zimmerman
(74) *Attorney, Agent, or Firm*—Bacon & Thomas

(57) ABSTRACT

A copper-free wire having worked faces meaning faces drawn with dies and unworked faces continued in the circumferential direction on a wire surface, the copper-free wire has LD/LT ranging from 0.51 to 0.84 and LY ranging from 10 to 40 $\mu$m when measurement lines are drawn at every 5 $\mu$m in a width direction of a measurement area (10,000 $\mu m^2$=100 $\mu$m×100 $\mu$m) on the wire surface about 4 wire faces, in which each of the measurement straight lines having a length in the circumferential direction includes at least two worked faces and unworked faces, respectively, in the measurement area, and its starting point and termination point which are all positioned on contact points of the worked faces and the unworked faces.

1 Claim, 9 Drawing Sheets

COPPER-FREE WIRE

BACKGROUND OF THE INVENTION

1. Field of the Invention

The present invention relates to copper-free wires, and more particularly, to a copper-free wire which is excellent in feedability and arc stability even though the surface thereof is not copper-plated.

2. Description of the Related Art

Development of a welding wire from a conventional welding electrode for shielded metal arc welding has improved welding workability by a great amount. Recently, welding is being increasingly carried out via semi-automatic welding, automatic welding or robot welding since welding wires can be fed by a large amount regardless of places. In particular, the ratio of the semi-automatic welding is increasing even in the shipbuilding industry so that the amount of the welding wires in use is increasing.

As welding conditions are developed and applied into various forms due to welding automation and diversification of applications as above, the basic property of welding wire is a principal factor about feedability besides arc stability.

For the purpose of satisfying quality requirements for a welding wire, conductive metal such as copper is conventionally plated on welding wire surface so as to guarantee properties of the wire such as conductivity, feedability and rust resistance. In other words, conductive metal such as copper is plated on the welding wire surface so as to enhance the conductivity and arc stability in respect to a welding tip (contact tube), reduce the quantity of spatter or fume generation, and ensure an excellent weldability. In a copper-plated wire, however, plating quality is directly associated with the quality of a product wire so that the plating quality becomes the most prominent management factor in the wire quality. That is reason why steel parts beneath a plated layer come out by having poor copper coating, and this phenomenon thereof is directly associated with problems such as conductivity at a contact tip (contact tube), feedability due to friction in a conduit cable and rust resistance of the wire.

Therefore, in the copper-plated wire, efforts for obtaining excellent plating quality have been made in order to improve the quality of the wire.

In the meantime, plating adhesiveness is one of the most common factors for estimating the plating quality as above, and several methods are represented in the JIS H8504 which estimates the plating adhesiveness. One of the easiest methods is a adhesiveness scheme wound like coil shape, by which a wire is wound around itself or a mandrel for at least several times so as to estimate cracking or peeling off of a plated layer on the wire surface and is estimated through magnification with a microscope. In the above estimation scheme, the cracking or peeling off of the plated layer occurs by a smaller amount if the wire has more excellent plating adhesiveness. This property is directly linked to the feedability of the wire.

However, nevertheless several advantages including the above, the copper-plated wires have drawbacks such as difficulties in plating quality management, environmental problems originated from plating processes, poor quality insufficient to desirable level and the like. Lately, it is being required to develop a copper-free wire having qualities at least the same as those of the plated wires. Although technologies have been actively developed for copper-free wires up to now, the copper-free wires have failed to show properties more excellent than those of the copper-plated wires considering feedability or other workability thereby interrupting commercialization thereof. In particular, the copper-free wires require a novel approach different from the conventional plated wires in order to improve the properties relating to causing by non-plating such as conductivity, feedability and rust resistance.

In the meantime, the copper-free wires introduced up to now inevitably adopted a surface treatment agent on the wire surface. Examples of those wires are disclosed in Japanese Patent No. 2682814 entitled "Wire for Arc Welding", Japanese Laid Open Patent Application No. H11-147174 entitled "Non-Plating Welding Wire for Steel", Japanese Laid Open Patent Application No. H12-94178 entitled "Welding Wire Without Plating" and the like. According to those documents, a feeding lubricant powder such as $MoS_2$, $WS_2$ and C or a mixture thereof is applied to the wire surface or a feeding lubricant is coated on the wire surface in order to enhance feedability. Further, Japanese Laid Open Patent Application No. H12-117483 entitled "Welding Wire" discloses an uneven wire having a uniform wavelength in the circumferential direction of the wire, in which excellent arc start property can be obtained through management of a peak intensity range detected in the power spectra. Also, Japanese Laid Open Patent Application No. H12-317679 entitled "Non-Plating Wire for Arc Welding and Arc Welding Method" discloses a technology for sticking particles of insulating inorganic powder and/or conductive inorganic powder on the welding wire surface with water soluble polymer so as to decrease the quantity of fume or spatter generation.

With the above documents, however, fume is inevitably generated due to fine powder coated on the wire surface. Since uniform coating of powder can be hardly carried out, quantitative management is difficult, and the quantity of spatter generation may be accelerated rather if coated ununiformly.

Further, as disclosed in Korean Patent No. 134857, it is proposed to smoothen the wire surface to the utmost to reduce friction within a conduit liner thereby enhancing feedability.

In the above copper-free wires, however, a wire manufacturing process generally employs a wet skin pass technique in the final stage thereof, in which the rust resistance of the wire is obtained via lubricant pool management, selection of a surface treatment agent and uniform coating.

Further, the above copper-free wires have a poor feeding ability compared to the conventional plated wires in a high speed welding and a long cable condition in which its feedability is heavily influenced by factors such as the smoothness of the wire surface and tensile strength (T/S). The poor feeding ability generates slip in a feeding roller of a feeder section in welding thereby leading to an irregular feeding.

SUMMARY OF THE INVENTION

Accordingly the present invention is provided to solve the foregoing problems of the related art and it is an object of the invention to provide a copper-free wire which has a uniform degree of concave roughness (凹) in the surface thereof to obtain excellent feedability and arc stability.

It is another object of the invention to provide a copper-free wire which does not require a lubricant powder coating, which is treated to the surface of the foregoing non-plating wire, thereby reducing the quantity of fume generation in welding.

According to an aspect of the invention to solve the foregoing object, it is provided a copper-free wire having worked faces meaning faces drawn with dies and unworked faces continued in the circumferential direction on a wire surface, the copper-free wire having LD/LT ranging from 0.51 to 0.84 and LY ranging from 10 to 40 μm when measurement lines are drawn at every 5 μm in a width direction of a measurement area (10,000 μm²=100 μm×100 μm) on the wire surface about 4 wire faces, in which each of the measurement straight lines having a length in the circumferential direction includes at least two worked faces and unworked faces, respectively, in the measurement area, and its starting point and termination point which are all positioned on contact points of the worked faces and the unworked faces, wherein the LD/LT is defined according to Equation 1, and the LY is defined according to Equation 2:

$$LD/LT = \frac{1}{80}\left[\sum_{n=1}^{4}\left\{\sum_{x=1}^{20}\left(\frac{ld}{lt}\right)_x\right\}_n\right], \quad \text{Equation 1}$$

and $$LY = \frac{1}{K}\sum_{y=1}^{k} ly, \quad \text{Equation 2}$$

wherein ld is the sum of length of the measurement straight lines across the worked faces, lt is the length of the straight, and ly is the width of the worked faces across one straight line having a length of 100 μm in the measurement area, x indicates the measurement lines in the measurement area in each of the wire faces, n indicates 4 faces around the wire, and K indicates the number of the worked faces across one straight line.

DETAILED DESCRIPTION OF THE PREFERRED EMBODIMENT

Figure 1A:
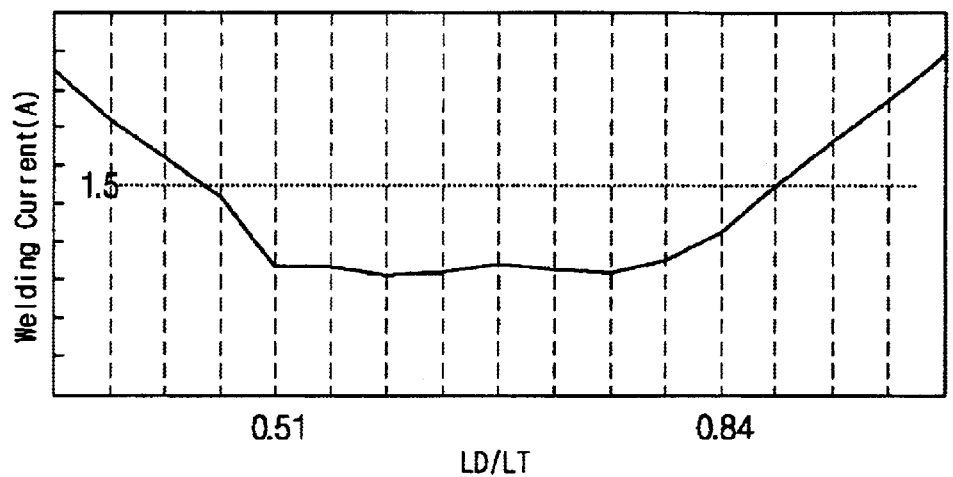
FIG. 1A is a graph illustrating the relation between the ratio of worked faces to unworked faces LD/LT and welding current.

The inventors have applied conventional copper-plated wires and copper-free wires to actual welding while thoroughly investigating the same focused on factors influencing feedability. Therefore, the present invention is based upon the understanding that welding load current measured at a feeder section as a criterion of the feedability is applied in a totally different manner between a copper-plated wire and a copper-free wire.

In the copper-plated wires, the welding load current measured with the Arc Monitoring System WAM-4000D (VER 1.0) is about 1.9A in most cases even though varied according to welding conditions and restraining conditions of a cable. (Of course, the limiting welding load current rises according to plating cohesiveness and plating thickness.) In the copper-free wires, welding wasn't carried out normally at the limiting welding load current over 1.5A. From this, the inventors found that frictional force in a conduit liner in feeding the copper-free wires is basically different from that in feeding the copper-plated wires, and focused the research on this.

As described above, the conventional copper-free wires have adopted a wet drawing method, e.g. skin pass, for enhancing the smoothness of the wire surface by focusing product development on minimization of the frictional force between a non-plated wire and the conduit layer. However, those wires fail to overcome slip generated in a feeder section but bring a problem that a surface treatment agent applied for maintaining feedability and enhancing rust resistance increases the quantity of fume generation in welding. In other words, studies of the feedability have been focused only on decrease of the frictional force between the welding wire and the conduit liner.

Therefore, based upon a novel aspect which is totally different from the conventional one, the inventors imparted a proper degree of roughness to the wire surface to ensure wire feedability instead of promoting smoothness to the wire surface as pursued in the conventional copper-free wires. As a result of observing arc discharge of the welding wire and arc transfer thereof into molten metal, it has been found that arc and spatter generation is closely related to contact between the wire and the inner face of a contact tip hole at the leading end of a welding torch. Then, the inventors made a concentrated study on the conception of the above observation. As a result, it is found that the feedability and arc stability are improved when LD/LT ranges from 0.51 to 0.84 and at the same time LY ranges from 10 to 40 μm as the optimum ranges for stably contacting the wire to the contact tip hole inner face in the leading end of the welding torch, in which the LD/LT means a certain degree of concave roughness (i.e. roughness in the down direction of the wire surface) of the wire surface in about the worked faces and the LY means the mean size of the worked faces.

It is considered that the above result is obtained by providing the wire with a certain degree of concave roughness corresponding to the inner surface of the contact tip hole which has a certain degree of roughness due to its uneven shape (凸, 凹) so that convex portions (凸) of the contact tip hole can stably contact to the worked faces of the wire.

This is totally different from a concept disclosed in Korean Patent, No.134857, which enhances the feedability through roughness control. According to this document, the roughness control is performed for only enhancing the feedability without consideration of contact to the contact tip.

In the invention, when lines to be measured (hereinafter will be referred to as measurement lines) are drawn at every 5 μm in the width direction of a certain measurement area A on the wire surface (i.e. in the longitudinal direction of the wire) about 4 wire faces, in which each of the measurement straight lines has any length in the wire width direction and includes at least two worked faces and unworked faces, respectively, in the measurement area A, the LD/DT defined according to Equation 1 ranges from 0.51 to 0.84 and the LY defined according to Equation 2 ranges 10 to 40 μm, in which ld is the entire length of the measurement straight lines across the worked faces, lt is the length of the straight lines, and ly is the width of a worked face across any straight line having a length of 100 μm in the measurement area.

In order to obtain a wire with the LD/LT of 0.51 to 0.84 and the LY (i.e. mean width of the worked faces) of 10 to 40 μm, it is necessary to adequately manage conditions of the surface roughness and a drawing process after descaling of an original rod. In particular, control of the surface roughness after descaling is important. In a descaling process of the original rod (5.5 mm), when the rod is observed by variously changing the surface roughness of the rod after descaling, the entire reduction ratio (i.e. original rod (5.5 mm)/final product diameter) is 90% or more at all wires regardless of manufacturing methods such as dry and wet types, if the surface roughness of the rod is 0.36 μm or less after descaling, thus the LD/LT exceeds 0.84. Otherwise, if the wire has a surface roughness of 0.75 μm or more after descaling, the LD/DT is 0.51 or less due to the reduction ratio between dies. Therefore, in order to obtain a wire with the LD/LT of 0.51 to 0.84 and the LY of 10 to 40 μm, it is necessary to adjust the surface roughness as 0.36 to 0.75 μm after descaling of the original rod. This can be obtained by applying both of a conventional acid pickling and a mechanical descaling in the descaling process and adjusting the drawing rate, the die configuration (bearing length and reduction angle) and the reduction ratio between dies. Of course, the LY is adjustable within 10 to 40 μm, which is the range of the invention, through combination of the above process conditions (e.g. via an acid pickling after the first drawing and/or second drawing and adjustment of the drawing rate).

Hereinafter it will be explained about reasons of limitations of numerical values according to the invention.

(1) When the LD/LT is 0.84 or more since the rod has a number of worked faces and the LY is 10 μm or less since the worked faces are small sized (e.g. When the surface roughness of the rod is 0.36 μm or less (Ra reference, hereinafter will be the same) and the drawing rate is too fast), friction within the conduit liner increases so that the welding load current exceeds 105A and accordingly the feedability is lowered. This is caused since the carrying ability of feeding (i.e. lubricant) oil is lowered even though the above condition requires lubricant oil for improving the feedability.

(2) When the LD/LT is 0.84 or more since the rod has a number of worked faces and the LY exceeds 40 μm since the worked faces are large sized (e.g. When the surface roughness of a wire is 0.36 μm or less and the reduction ratio in drawing is too large), the slip ratio in a feeding roller of a feeder section increases so that the welding load current rises over 1.5A and accordingly the feedability is extremely lowered. As a result of an actual test, such a wire showed the worst feeding rate in a welding condition, in particular, of medium current or more.

(3) When the LD/LT is 0.51 or less since the rod has a small number of worked faces and the LY is 10 μm or less (e.g. When the wire surface roughness is 0.75 μm or more after descaling, the reduction ratio between the dies is too small, and an excessive electrolytic acid pickling is carried out in a drawing process), the friction within the conduit liner increases so that the welding load current exceeds 1.5A and accordingly the feedability is lowered. Direct friction increases between the wire surface and the inner surface of the conduit liner due to the roughness of the wire surface.

(4) When the LD/LT is 0.51 or less since the rod has a small number of worked faces and the LY exceeds 40 μm since the worked faces are large sized (e.g. When the wire surface roughness is 0.75 μm or more after descaling, the die reduction ratio is too large in drawing, and the die drawing angle is unbalanced), the worked faces are ununiformed across four faces in circumferential directions thereby causing feedability and arc unstable.

Embodiment

Welding wires (diameter of 1.2 mm) of AWS ER70S-6 (JIS Z3312 YGW12) are fabricated in order to confirm the feedability and the like of the welding wire of the invention. The welding wires of the invention are compared with comparative examples by measuring the surface roughnesses, the worked shapes of wire surfaces and the like, and performing a welding test as follows. Results thereof are shown in Tables 1A and 1B.

1. Measurement of Roughness of Original Rod, Wire and Contact Tip after Descaling Measuring Device: Surface Roughness Meter DIAVITE DH-5

Roughness Parameter: Ra

Cut-off $l_c$: 0.08 mm

Traversing length $l_t$: 15 mm

Measuring length $l_m$: 12.5 mm

2. Measurement of LD/LT and LY

Figure 2A:
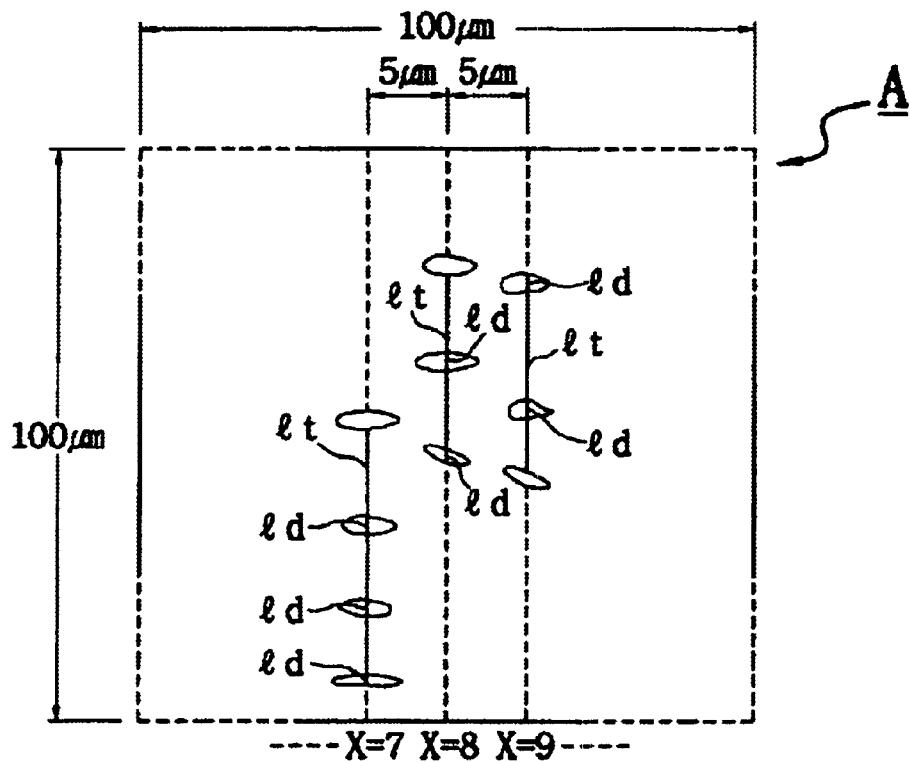
FIGS. 2A and 2B illustrate a method of measuring the LD/LT and the LY at a wire surface (10,000 μm²×100 μm)
Figure 2B:
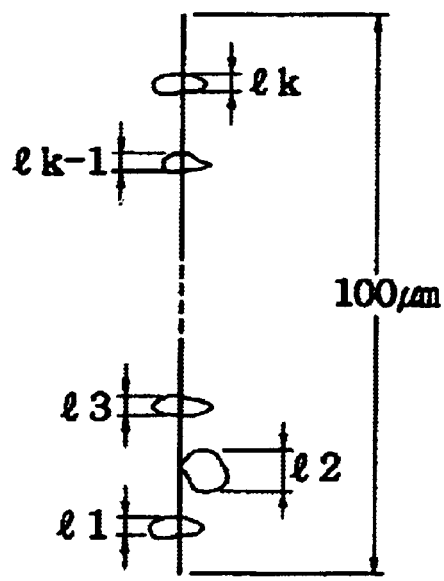

A wire sample 30 mm is extracted, and the surface thereof is photographed with an SEM (X600). The wire sample is measured for 20 times at every 5 μm in the longitudinal direction of the wire for the circumferential 4 faces (i.e. total 80 times) about a measurement area of 10,111 μm² (100 μm×100 μm) with an image analyzer (e.g. Image-Pro Plus 4.1 available from Media Cybernetics). Then, LD/LT, i.e. the length ratio of the worked faces to the unworked faces, and LY, i.e. the mean size of the worked faces are calculated according to Equations 1 and 2 (refer to FIGS. 2A and 2B):

$$LD/LT = \frac{1}{80}\left[\sum_{n=1}^{4}\left\{\sum_{x=1}^{20}\left(\frac{ld}{lt}\right)_x\right\}_n\right], \quad \text{Equation 1}$$

and

-continued $$LY = \frac{1}{K}\sum_{y=1}^{k} ly, \quad \text{Equation 2}$$

wherein ld indicates the sum of lengths of the measured straight lines across the worked faces on the measurement straight lines, lt indicates the length of the measurement straight lines, in which the starting point and the termination point of the it are positioned on contact points of the worked faces and the unworked faces, x indicates the measurement lines in the measurement area in each of the wire faces, n indicates 4 faces around the wire, ly indicates the width of the worked faces across any of the straight lines having a length of 100 μm in the measurement area, and K indicates the number of the worked faces across any straight line.

Although the LY is the mean value of the worked faces to the sum width in a straight line, it may represent the size of one worked face in the entire wire since the wire is drawn in length.

3. Welding and Feedability Test Conditions
Current (A): 300
Voltage (V): 34
Travel speed (CPM): 40
Shielding gas: $CO_2$ 100%
Cable Conditions: Length 5 m, Twist 2-turn with 300 mm in diameter
Device for Estimating Feeding Motor Load and Arc Stability: Arc Monitoring System WAM-4000D (Ver 1.0)
Pic. 1: Wire surface of comparative example 1 taken by an optical microscope (X200)
Pic. 2: Wire surface of comparative example 3 taken by an optical microscope (X200)
Pic. 3: Wire surface of comparative example 5 taken by an optical microscope (X200)
Pic. 4: Wire surface of comparative example 8 taken by an optical microscope (X200)

Figure 3A:
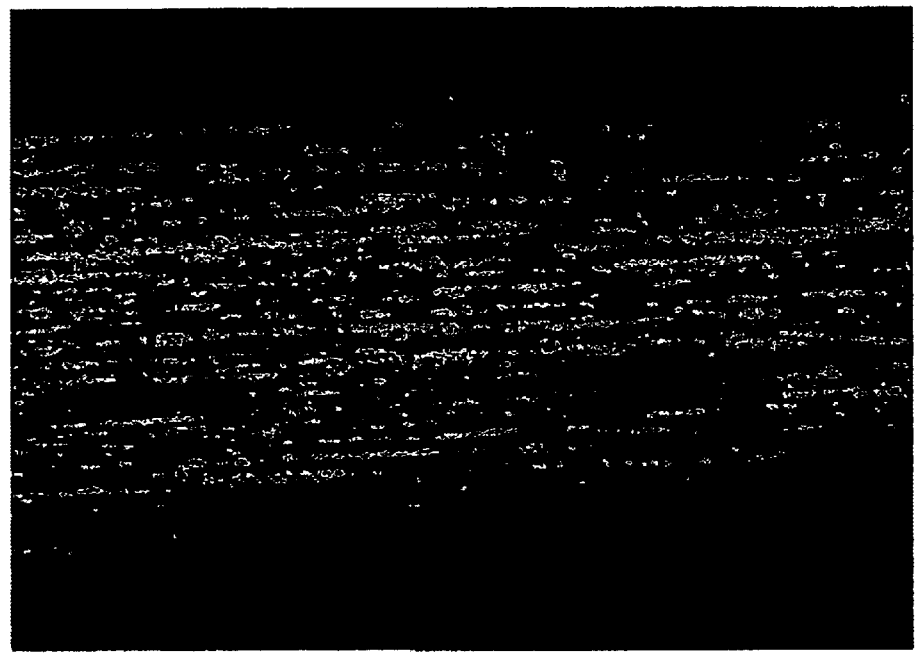
FIG. 3A: Wire surface of comparative example 1 taken by an optical microscope (X200)
Figure 3B:
FIG. 3B: Wire surface of comparative example 3 taken by an optical microscope (X200)
Figure 3C:
FIG. 3C: Wire surface of comparative example 5 taken by an optical microscope (X200)
Figure 3D:
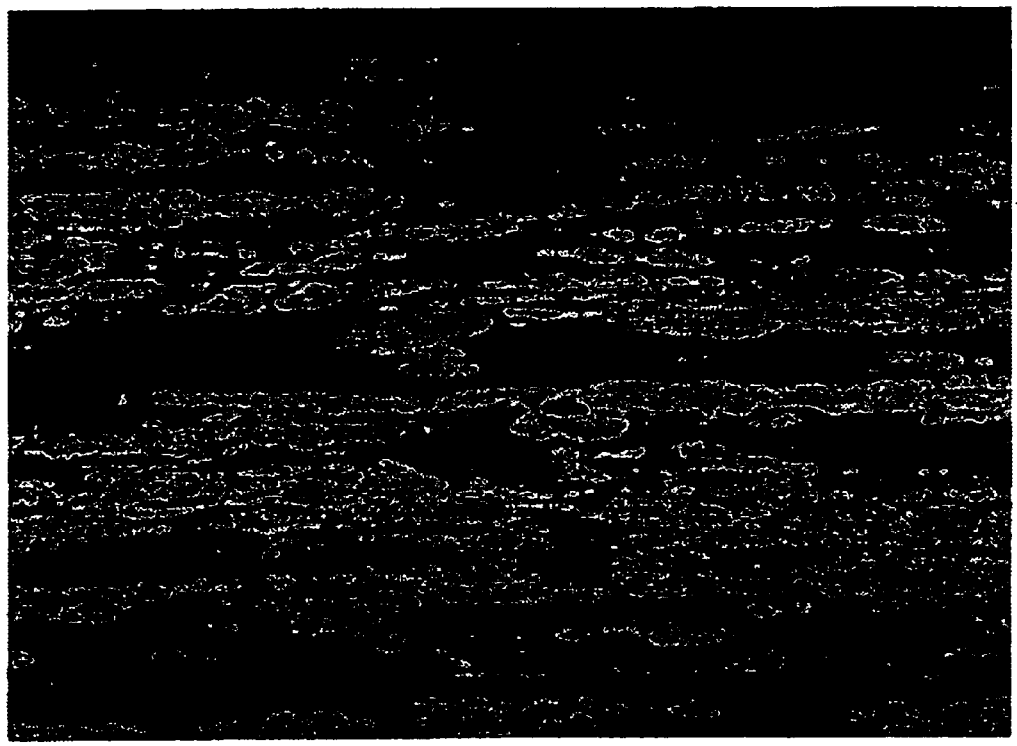
FIG. 3D: Wire surface of comparative example 8 taken by an optical microscope (X200)
Figure 3E:
FIG. 3E: Titled surface of wire of comparative example 4 taken by an SEM (X600)
Figure 3F:
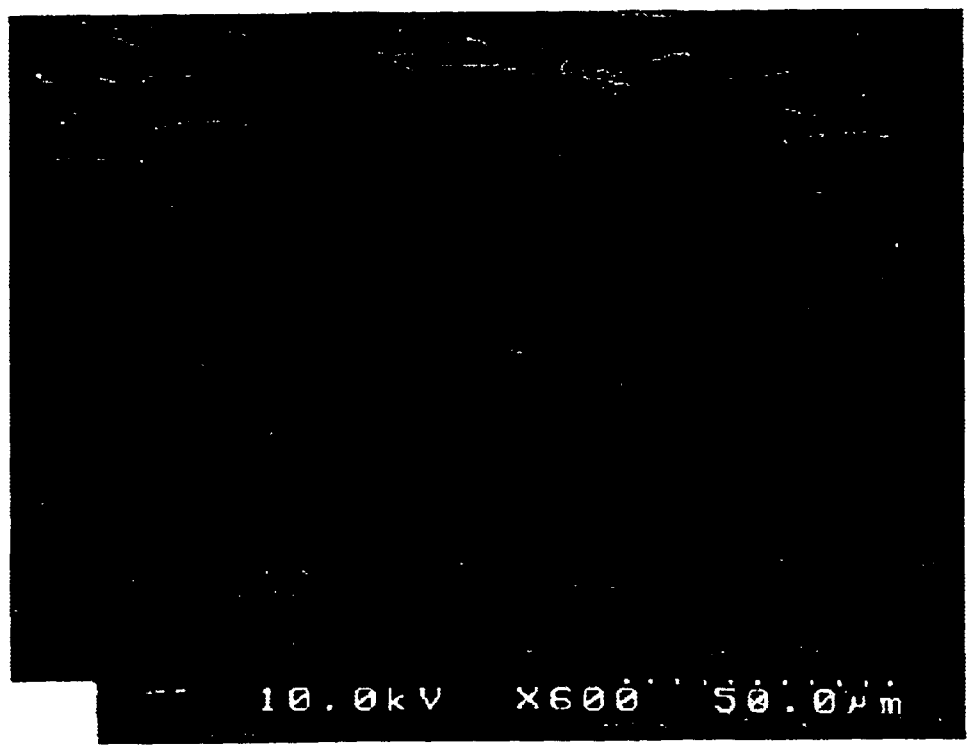
FIG. 3F: Flat surface of wire of comparative example 4 taken by an SEM (X600)
Figure 3G:
FIG. 3G: Wire surface of embodiment 13 taken by an optical microscope (X200)
Figure 3H:
FIG. 3H: Wire surface of embodiment 14 taken by an optical microscope (X200)
Figure 3I:
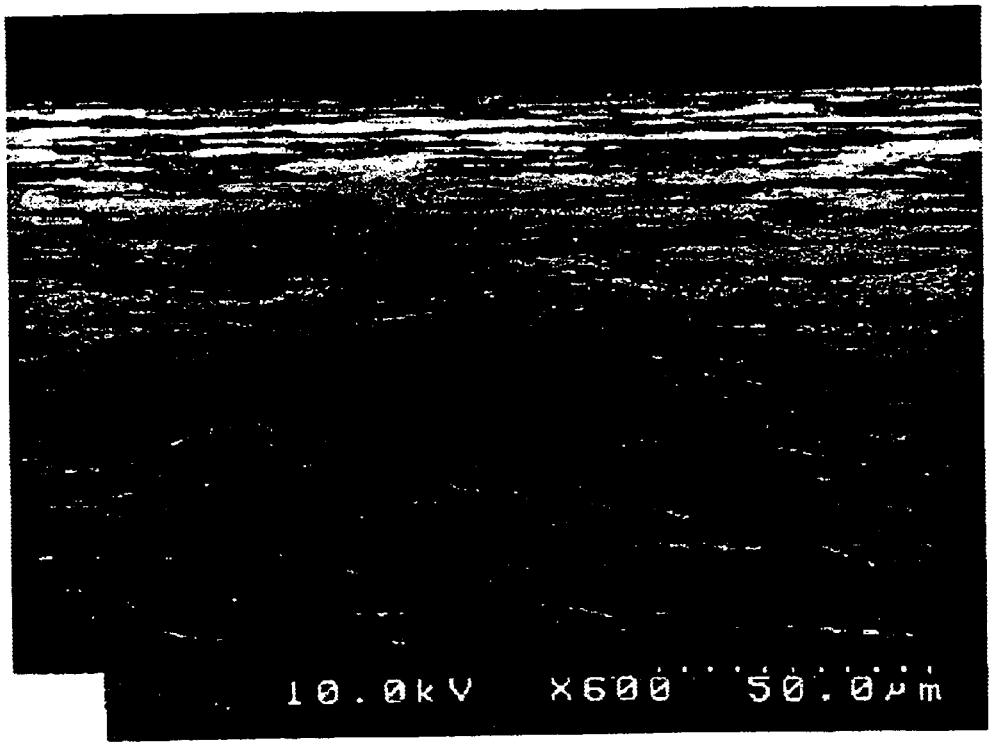
FIG. 3I: Tilted Surface of wire of embodiment 12 taken by an SEM (X600)
Figure 3J:
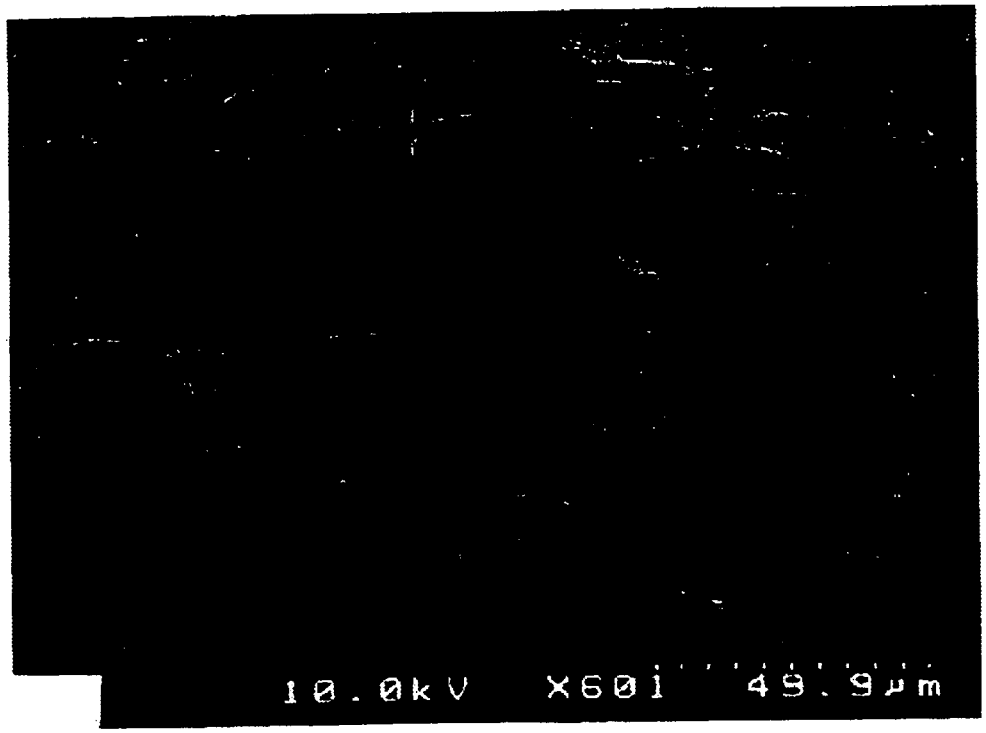
FIG. 3J: Flat Surface of wire embodiment 12 taken by an SEM (X600)
Figure 3K:
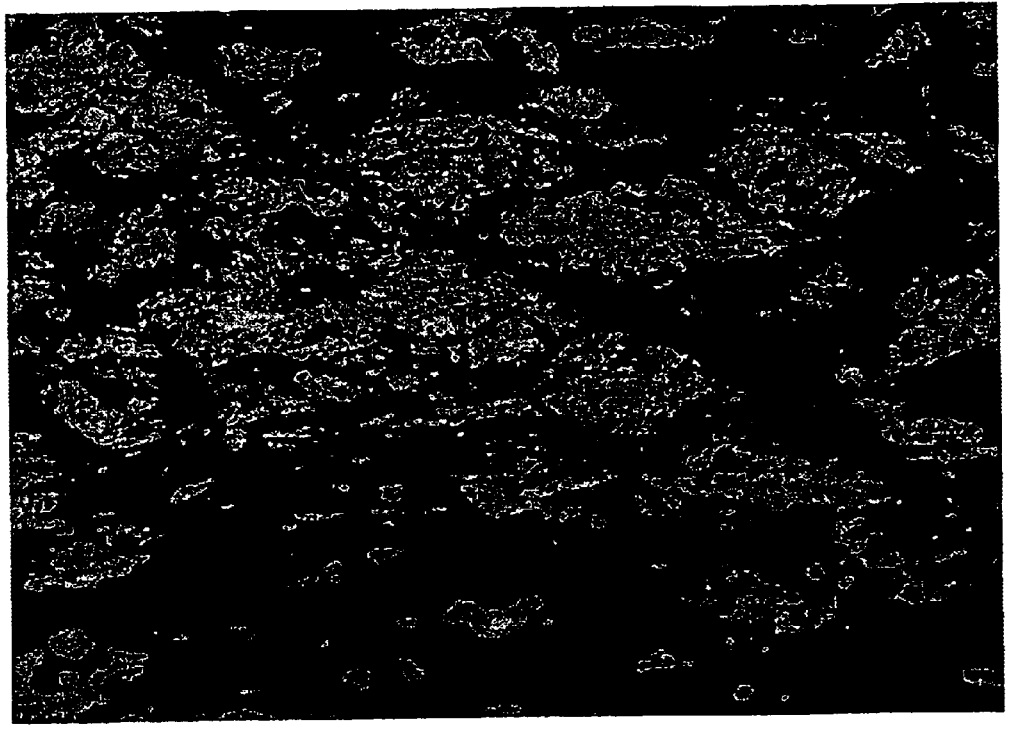
FIG. 3K: Contact tip inner hole with Ra=0.97 μm taken by an optical microscope (X200)
Figure 3L:
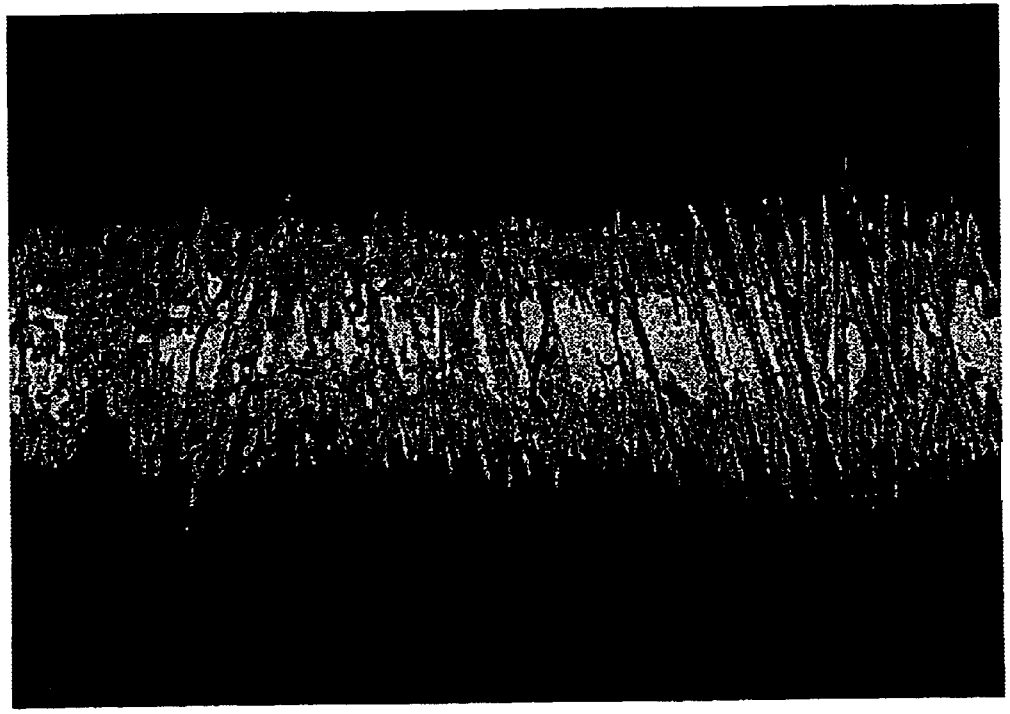
FIG. 3L: Contact tip inner hole with Ra=0.09 μm taken by an optical microscope (X200)
Figure 3M:
FIG. 3M: Contact tip inner hole with Ra=0.97 μm taken by an SEM (X600)
Figure 3N:
FIG. 3N: Contact tip inner hole with Ra=0.09 μm taken by as SEM (X600).

As shown in Tables 1, it can be seen that the embodiments 9 to 16 in the range of the invention have lower welding load currents, more stable arcs, less amount of spatter generation and thus excellent feedabilities in respect to the comparative examples. Further, the comparative examples generate fumes by larger quantities compared to the embodiments since lubricant oil for feeding and a lubricant powder for enhancing the feedability according to the conventional method. For reference, Both FIG. 3g and 3h are pictures of wires corresponding to the embodiments 13 and 14 taken by an optical microscope, Both FIG. 3i and 3j are surface pictures of a wire corresponding to the embodiment 12 taken by an SEM, in which FIG. 3i is a perspective view and FIG. 3j is a plan view.

However, as can be seen in Tables 1, the embodiments 9 and 10 show elevation in the slip ratios by a small amount since the LD/DTs are high and the LYs are relatively large. In particular, the arc is a little longer due to increase of the welding load current in the embodiment 10. Further, in the embodiments 15 and 16, relatively low LD/DTs act as a source elevating the frictional force in the conduit liners thereby increasing the slip ratios by a small amount.

Figure 1B:
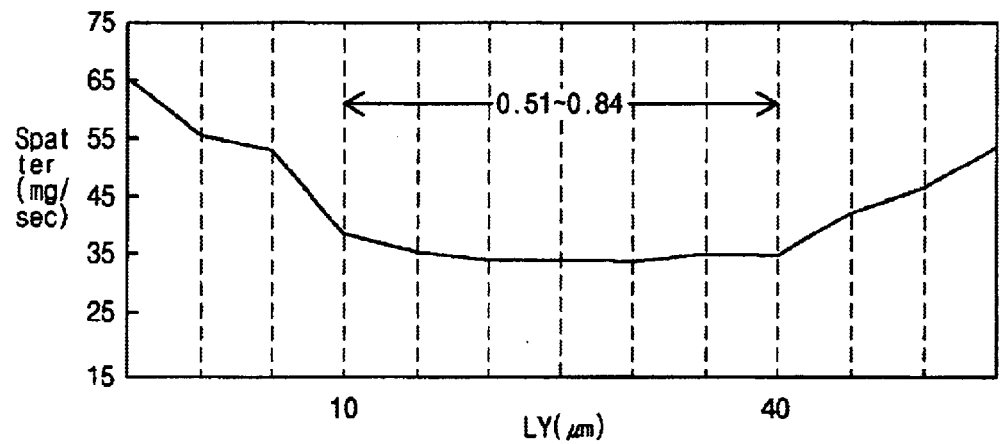
FIG. 1B is a graph illustrating the relation between the mean worked face size LY and the quantity of spatter generation.

FIG. 1A is a graph illustrating the relation between the LD/LT and the welding load current, and FIG. 1B is a graph illustrating the relation between the LY and the quantity of spatter generation, in which the ranges of the invention are shown.

In the comparative examples 1 and 2, LD/LTs are 0.84 or more since worked faces exist by a large number and LYs are 10 μm or less since the worked faces are small. The LD/LTs and the LYs reach beyond the ranges of the invention to increase friction in the conduit liners so that the welding load currents exceed 1.5A and the feedabilities are lowered. Further, the slip ratios increase in feeder sections due to the excessively large worked faces thereby degrading the arc stabilities. For reference, FIG. 3a illustrates a wire surface of the comparative example 1 taken by the optical microscope. In the range where the contact tip is roughly

TABLE 1

| | Roughness Ra ( ) | | | LD/LT | LY ( ) | Slip Ratio (%) | Welding load Current (A) | Feedability (2 Turns) | Arc Stability | Spatter (mg/sec) | Fume (mg/sec) |
|---|---|---|---|---|---|---|---|---|---|---|---|
| | rod | wire | Cont. tip | | | | | | | | |
| Comparative examples | | | | | | | | | | | |
| 1 | 0.34 | 0.11 | 0.09~0.97 | 0.85 | 9 | 2.4 | 1.51 | | x | 56.4 | 14.1 |
| 2 | 0.31 | 0.2 | 0.09~0.97 | 0.84 | 8 | 2.2 | 1.53 | | x | 54.5 | 14.3 |
| 3 | 0.28 | 0.1 | 0.09~0.97 | 0.88 | 37 | 5.1 | 1.72 | x | | 47.3 | 13.4 |
| 4 | 0.36 | 0.17 | 0.09~0.97 | 0.87 | 44 | 5.4 | 1.68 | x | x | 63.2 | 13.6 |
| 5 | 0.76 | 0.46 | 0.09~0.97 | 0.48 | 7 | 3.5 | 1.63 | x | x | 65.4 | 13.3 |
| 6 | 0.77 | 0.56 | 0.09~0.97 | 0.43 | 8 | 4.1 | 1.59 | x | x | 67.2 | 13.5 |
| 7 | 0.81 | 0.12 | 0.09~0.97 | 0.5 | 42 | 2.7 | 1.52 | | x | 54.2 | 14.2 |
| 8 | 0.79 | 0.17 | 0.09~0.97 | 0.49 | 36 | 4.3 | 1.65 | x | | 42.8 | 13.4 |
| Embodiments | | | | | | | | | | | |
| 9 | 0.38 | 0.5 | 0.09~0.97 | 0.74 | 35 | 1.8 | 1.33 | ○ | ○ | 36.7 | 11.3 |
| 10 | 0.49 | 0.46 | 0.09~0.97 | 0.83 | 37 | 1.6 | 1.45 | ○ | | 41.3 | 11.5 |
| 11 | 0.51 | 0.45 | 0.09~0.97 | 0.67 | 30 | 0.9 | 1.35 | ○ | ○ | 37.1 | 11.4 |
| 12 | 0.47 | 0.46 | 0.09~0.97 | 0.65 | 25 | 1.2 | 1.28 | ○ | ○ | 36.5 | 11.3 |
| 13 | 0.53 | 0.49 | 0.09~0.97 | 0.55 | 21 | 1.1 | 1.31 | ○ | ○ | 34.7 | 11.1 |
| 14 | 0.55 | 0.4 | 0.09~0.97 | 0.6 | 19 | 1.5 | 1.34 | ○ | ○ | 35.6 | 11.2 |
| 15 | 0.61 | 0.45 | 0.09~0.97 | 0.54 | 15 | 1.9 | 1.37 | ○ | ○ | 37.4 | 11.4 |
| 16 | 0.73 | 0.48 | 0.09~0.97 | 0.51 | 12 | 1.7 | 1.41 | ○ | | 40.5 | 11.6 |

*○: Good, Δ: Average, x: Bad
*Slip Ratio (%) = (rotation speed of feeding roller − wire speed of fed wire)/(rotation speed of feeding roller) × 100 worked, the worked faces are small sized to make contact unstable thereby increasing the quantity of spatter generation. Such a wire type requires a feeding lubricant for enhancing feedability, but the feedability thereof is poor since the lubricant has poor carrier ability.

In the comparative examples 3 and 4, LD/DTs are 0.84 or more since worked faces exist by an excessively large amount and LYs exceed 40 μm since the worked faces are large sized. The LD/LTs and the LYs reach beyond the ranges of the invention so that slip takes place at the feeding rollers of the feeder sections showing extremely bad feedabilities. In particular, welding can be hardly carried out in a feeding condition of at least medium current. However, it can be seen that the LY of the comparative example 3 is in the ranges of the invention and the arc of the comparative example 3 is more or less stabilized compared to the comparative example 4. For reference, FIG. 3b shows a wire surface of the comparative example 3 taken by the optical microscope, and FIGS. 3e and 3f and 6 show a wire of the comparative example 4 taken by the SEM, in which FIG. 3e is a perspective view and FIG. 3f is a plan view.

In practice, almost of all contact tips show the roughnesses Ra of the inner faces ranging from 0.09 to 0.97 μm (refer to FIGS. 3k to 3n), in which it is confirmed that the contact tip in such a wide range of roughness can stably contact to the inventive wire (in particular having the inventive LY) so that the arc is stabilized. Therefore, it can be assumed that the arc stability is more closely related to the LY rather than LD/LT defined in the invention.

In the comparative examples 5 and 6, LD/LTs are 0.51 or less since worked faces are less and LYs are 10 μm since the worked faces are small sized. Friction in the conduit liners increases due to relative roughness of the surface so that the welding load currents are steeply increased resulting in poor feedabilities. In the range 0.97 μm where the contact tip is roughly worked, the worked faces are small sized and thus contact is unstable so that the quantities of spatter generation increase. For reference, FIG. 3c shows a wire surface of the comparative example 5 taken by the optical microscope.

In the comparative examples 7 and 8, LD/LTs are 0.51 or less since worked faces exist by a small amount and LYs exceed 40 μm since the worked faces are large sized. The worked faces are made unstable across circumferential 4 faces so that feedabilities and arcs are unstable. However, the comparative example 7 has the LD/LT approaching the range of the invention so that the feedability is more or less stable. In the comparative example 8, it can be seen that the arc is more or less stabilized in the inventive range where the worked face size allows the worked faces to stably contact to the contact tip. For reference, FIG. 3d shows a wire surface of the comparative example 8 taken by the optical microscope.

As described hereinbefore, the present invention provides the welding wire excellent with stable feedability as well as arc stability by adjusting the size and ratio of the worked faces on the wire surface. Further, the inventive welding wire is not plated as well as excludes a lubricant powder that is coated on the surface of the conventional copper-free wire thereby reducing the quantity of fume generation in welding.

What is claimed is:

1. A copper-free wire having worked faces meaning faces drawn with dies and unworked faces continued in the circumferential direction on a wire surface, the copper-free wire has LD/LT ranging from 0.51 to 0.84 and LY ranging from 10 to 40 μm when measurement lines are drawn at every 5 μm in a width direction of a measurement area (10,000 μm² = 100 μm × 100 μm) on the wire surface about 4 wire faces, in which each of the measurement straight lines having a length in the circumferential direction includes at least two worked faces and unworked faces, respectively, in the measurement area, and its starting point and termination point which are all positioned on contact points of the worked faces and the unworked faces, wherein the LD/LT is defined according to Equation 1, and the LY is defined according to Equation 2:

$$LD/LT = \frac{1}{80}\left[\sum_{n=1}^{4}\left\{\sum_{x=1}^{20}\left(\frac{ld}{lt}\right)_x\right\}_n\right], \quad \text{Equation 1}$$

and $$LY = \frac{1}{K}\sum_{y=1}^{k} ly, \quad \text{Equation 2}$$

wherein ld is the sum of length of the measurement straight lines across the worked faces, lt is the length of the straight lines, and ly is the width of the worked faces across one straight line having a length of 100 μm in the measurement area, x indicates the measurement lines in the measurement area in each of the wire faces, n indicates 4 faces around the wire, and K indicates the number of the worked faces across one straight line.

* * * * *